United States Patent
Hoffman et al.

[11] Patent Number: 6,050,283
[45] Date of Patent: Apr. 18, 2000

[54] SYSTEM AND METHOD FOR ON-SITE MIXING OF ULTRA-HIGH-PURITY CHEMICALS FOR SEMICONDUCTOR PROCESSING

[75] Inventors: Joe G. Hoffman, Cardiff; R. Scot Clark, Fallbrook, both of Calif.; Allen H. Jones, Jr., Prescott, Ariz.

[73] Assignee: Air Liquide America Corporation, Houston, Tex.

[21] Appl. No.: 09/051,304

[22] PCT Filed: Jun. 5, 1996

[86] PCT No.: PCT/US96/10389

§ 371 Date: Apr. 16, 1998

§ 102(e) Date: Apr. 16, 1998

[87] PCT Pub. No.: WO96/39651

PCT Pub. Date: Dec. 12, 1996

Related U.S. Application Data

[60] Provisional application No. 60/017,828, Mar. 8, 1996, and provisional application No. 60/018,104, Jul. 7, 1995.

[51] Int. Cl.[7] .................................................. G05D 11/13
[52] U.S. Cl. ..................................... 137/3; 137/5; 137/88; 137/93
[58] Field of Search .................................. 137/3, 5, 88, 93

[56] References Cited

U.S. PATENT DOCUMENTS 4,091,834  5/1978  Frigato .
5,522,660  6/1996  O'Dougherty et al. .............. 137/93 X

FOREIGN PATENT DOCUMENTS

WO92/16306  10/1992  WIPO .

Primary Examiner—Gerald A. Michalsky
Attorney, Agent, or Firm—Burns, Doane, Swecker & Mathis, L.L.P.

[57] ABSTRACT

A system and method for mixing and/or diluting ultrapure fluids, such as liquid acids, for semiconductor processing. The system includes first and second chemical dispensers, the first and second chemical dispensers adapted to contain first and second fluids to be mixed, respectively; a process connection between the first and second chemical dispensers which allows the first and second fluids to flow therethrough and intermingle to form a mixed fluid, the process connection further allowing the mixed fluid to flow to a location needed by the operator; and an ultrasonic wave emitting device provided in a location sufficient to transmit an ultrasonic wave through the mixed fluid, the device including means to measure the velocity of the wave through the mixed fluid, and thus indirectly measure a ratio defined by a quantity of the first chemical to a quantity of the second chemical in the mixed fluid.

25 Claims, 10 Drawing Sheets

SYSTEM AND METHOD FOR ON-SITE MIXING OF ULTRA-HIGH-PURITY CHEMICALS FOR SEMICONDUCTOR PROCESSING

CROSS-REFERENCE TO RELATED APPLICATIONS

This application is a national phase application filed under 35 U.S.C. §371, based on PCT/US96/10389, filed Jun. 5, 1996. This application also claims the benefit of priority under 35 U.S.C. §119(e) of provisional application Ser. Nos. 60/017,828, filed Mar. 8, 1996, and 60/018,104, filed Jul. 7, 1995.

BACKGROUND AND SUMMARY OF THE INVENTION

The present invention relates generally to semiconductor processing, and particularly to mixing ultrapure liquid reagents with great accuracy.

On-site Ultrapurification

The present inventors have developed a method for preparing ultra-high-purity liquid reagents (including aqueous HF, HCl, $NH_4OH$, $NH_4F$, and $HNO_3$) in an on-site system located at the semiconductor wafer production site. In the example of aqueous ammonia, this is performed by: drawing ammonia vapor from a liquid ammonia reservoir, and scrubbing the filtered vapor with high-pH purified water (preferably ultrapure deionized water which has been allowed to equilibrate with the ammonia stream). This discovery permitted conversion of commercial grade ammonia to ammonia of sufficiently high purity for high-precision manufacturing without the need for conventional column distillation. The drawing of the ammonia vapor from the supply reservoir serves by itself as a single-stage distillation, eliminating nonvolatile and high-boiling impurities, such as alkali and alkaline earth metal oxides, carbonates and hydrides, transition metal halides and hydrides, and high-boiling hydrocarbons and halocarbons. The reactive volatile impurities that could be found in commercial grade ammonia, such as certain transition metal halides, Group III metal hydrides and halides, certain Group IV hydrides and halides, and halogens, previously thought to require distillation for removal, were discovered to be capable of removal by scrubbing to a degree of ultrapurification which is adequate for high-precision operations. This is a very surprising discovery, since scrubber technology is traditionally used for the removal of macro-scale, rather than micro-scale, impurities. Details of such systems are described in copending U.S. application Ser. No. 08/179,001 filed Jan. 7, 1994, now U.S. Pat. No. 5,496,778, which is hereby incorporated by reference, and in copending provisional applications 60/023,358, 60/038,711 and 60/038,712 all filed Jul. 7, 1995. and all hereby incorporated by reference.

The present inventors have also developed systems for on-site purification of hydrogen peroxide, and details of such systems are described in copending U.S. provisional application 60/017,123 filed Jul. 7, 1995 which is hereby incorporated by reference.

BACKGROUND

Wet versus Dry Processing

One of the long-running technological shifts in semiconductor processing has been the changes (and attempted changes) between dry and wet processing. In dry processing, only gaseous or plasma-phase reactants come in contact with the wafer. In wet processing, a variety of liquid reagents are used for purposes such as etching silicon dioxide or removing native oxide layers, removing organic materials or trace organic contaminants, removing metals or trace organic contaminants, etching silicon nitride, etching silicon.

Plasma etching has many attractive capabilities, but it is not adequate for cleanup. There is simply no available chemistry to remove some of the most undesirable impurities, such as gold. Thus wet cleanup processes are essential to modern semiconductor processing, and are likely to remain so for the foreseeable future.

Plasma etching is performed with photoresist in place, and is not directly followed by high-temperature steps. Instead the resist is stripped, and a cleanup is then necessary. The materials which the cleanup must remove may include: photoresist residues (organic polymers); sodium; Alkaline earths (e.g. calcium or magnesium); and heavy metals (e.g. gold). Many of these do not form volatile halides, so plasma etching cannot carry them away. Clean-ups using wet chemistries are required.

The result of this is that purity of process chemicals at plasma etching is not as critical, since these steps are always followed by cleanup steps before high-temperature steps occur, and the cleanup steps can remove dangerous contaminants from the surface before high-temperature steps drive in these contaminants. However, purity of the liquid chemicals is much more critical, because the impingement rate at the semiconductor surface is typically a million times higher than in plasma etching, and because the liquid cleanup steps are directly followed by high-temperature steps.

However, wet processing has one major drawback, namely ionic contamination. Integrated circuit structures use only a few dopant species (boron, arsenic, phosphorus, and sometimes antimony) to form the required p-type and n-type doped regions. However, many other species are electrically active dopants, and are highly undesirable contaminants. Many of these contaminants can have deleterious effects, such as increased junction leakage, at concentrations well below $10^{13}$ $cm^{-3}$. Moreover, some of the less desirable contaminants segregate into silicon, i.e. where silicon is in contact with an aqueous solution the equilibrium concentration of the contaminants will be higher in the silicon than in the solution. Moreover, some of the less desirable contaminants have very high diffusion coefficients, so that introduction of such dopants into any part of the silicon wafer will tend to allow these contaminants to diffuse throughout, including junction locations where these contaminants will cause leakage.

Thus all liquid solutions which will be used on a semiconductor wafer should preferably have extremely low levels of all metal ions. Preferably the concentration of all metals combined should be less than 300 ppt (parts per trillion), and less than 10 ppt for any one metal, and less would be better. Moreover, contamination by both anions and cations must also be controlled. (Some anions may have adverse effects, e.g. complexed metal ions may reduce to mobile metal atoms or ions in the silicon lattice.)

Front end facilities normally include on-site purification systems for preparation of high-purity water (referred to as "DI" water, ie. deionized water). However, it is more difficult to obtain process chemicals in the purities needed.

BACKGROUND

Ultrapure Mixing

In the semiconductor processing industry, the accurate mixing of chemicals is a high priority. Variations in concentration of reagents introduce uncertainty in etch rates (and sometimes in selectivities), and hence are a source of process variation. Process variation is always undesirable, since variations from many source tend to cumulate.

Many ultrapure chemicals are required at more than one dilution. (For example, several different concentrations of HF are commonly used.) However, the cost per unit volume of transporting ultrapure chemicals is high, and therefore cost can be prohibitive if chemicals of all desired concentrations must be shipped to the manufacturing site. In particular, this is very inefficient with the very dilute acid solutions which are sometimes used.

Some semiconductor manufacturing companies are utilizing on site blending to produce several dilutions of chemicals, such as hydrofluoric acid, for their processes. This on site blending is beneficial for reducing costs for a variety of reasons:

only concentrated acid is shipped, and the excess water for dilute solutions does not incur shipping costs;

only one, or a substantially reduced number than normal, concentrate need be inventoried and handled, instead of larger volumes of several dilute chemicals; and real time concentration adjustments are feasible because the time required for transportation and handling is not required to implement a concentration adjustment.

However, the requirements of ultrapure liquid handling place great constraints on operations which would be very simple in normal fine chemical systems.

BACKGROUND
Ultrapure Mixing Using Load Cells

In one form of current on site blending equipment, it is known to utilize load cells to control the mass of chemicals to be blended. However, load cell instrumentation is limited by:

the unpredictable force exerted by the piping attached to the weighed mixing vessel;

laboratory instruments are required to determine incoming chemical assay and program adjustments to compensate for assay variability;

scale resolution inaccuracies are present for large dilution ratios; and expensive electronic equipment that is typically required is exposed to a corrosive chemical environments, and the electrical components are easily corroded, or the user must employ costly non-corroding equipment, if available and feasible.

Another known alternative is to use volumetric methods, such as disclosed in U.S. Pat. Nos. 5,148,945; 5,330,072; 5,370,269; and 5,417,346, assigned to Applied Chemical Solutions, Hollister, Calif. However, although these systems may offer increased resolution for high dilution ratios, they are inflexible with respect to ratio changes.

Therefore, the semiconductor industry and other industries using chemical mixtures are highly desirous of efficient, inexpensive equipment to mix chemicals on site.
Innovative Systems and Methods for Mixing Ultrapure Liquids The present application describes a new way of mixing ultrapure liquids on-site at a semiconductor production facility. To provide accurate control while maintaining very tight control over contamination, the multicomponent mixing is done using sequential additions.

Preferably the system comprises a closed-loop automatic control system, in which an electrical signal representing the sensed velocity or computed density is directed to a flow controller and fed back to a flow control valve in the process connection upstream of a point where the first and second fluids intermingle (feed-back control system). Alternatively or in conjunction therewith, a feed-forward control algorithm may be employed; that is, the system may employ means (for example ultrasonic) to sense the composition of the source chemicals, which may be time variable, and provide such sense data to a control architecture which controls downstream flow.

Also preferred are those systems wherein three or more chemicals are intermingled sequentially, that is, wherein the first and second chemicals are first mixed to form a first mixed fluid, the first mixed fluid is mixed with a third fluid chemical to form a second mixed fluid, and so on up to n−1 mixed fluids, wherein n is the number of fluids to be mixed.

Another aspect of the invention is a method of mixing two or more ultrapure fluids, the method comprising the steps of:

(a) providing at least a first fluid and a second fluid to be mixed;

(b) causing the fluids to flow through means which allow the fluids to be intermingled and thus form a mixed ultrapure fluid;

(c) directing an ultrasonic wave through the mixed fluid; and (d) measuring velocity of the velocity of the wave through the mixed fluid, thereby indicating the density of the mixed ultrapure fluid and indirectly measuring a ratio of a quantity of the first fluid to a quantity of the second fluid in the mixed fluid.

Preferred system and method embodiments include a computer having means to monitor and control mixing of chemicals in real-time by receiving signals from the sonic concentration monitor, comparing the signal received to a target ratio, and send a signal to the sonic concentration monitor.

Resulting advantages include:

the assay of each chemical can be determined within the system, and automatic compensation for variability can be programmed into the mixing controller;

load cell problems are avoided, thus improving accuracy; and the high resolution provided by the ultrasonic system provides mix accuracies of 1 part in 200 or better.

Further aspects and advantages of the invention will be forthcoming upon reading the following detailed description of the invention.

BRIEF DESCRIPTION OF THE DRAWING

The disclosed inventions will be described with reference to the accompanying drawings, which show important sample embodiments of the invention and which are incorporated in the specification hereof by reference, wherein:

FIGS. 3B1–3B3 show detailed P&ID diagrams of a sample implementation of the process flow of FIG. 3A.

DETAILED DESCRIPTION OF THE PREFERRED EMBODIMENTS

Figure 1:
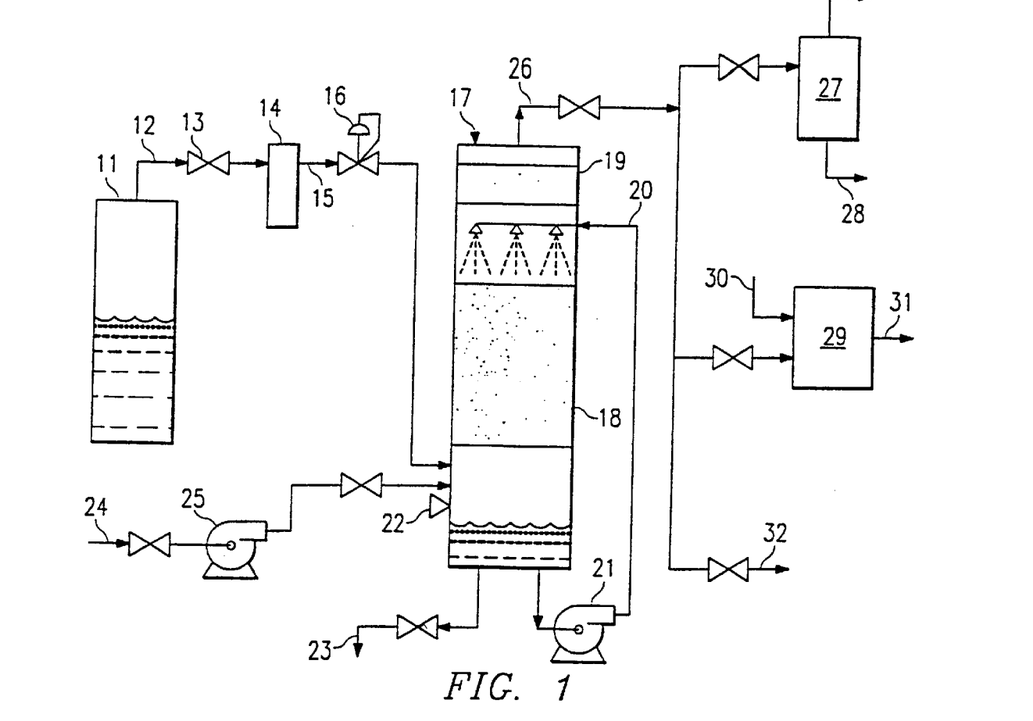
FIG. 1 is an engineering flow diagram of one example of a unit for the production of ultrapure ammonia.
Figure 1A:
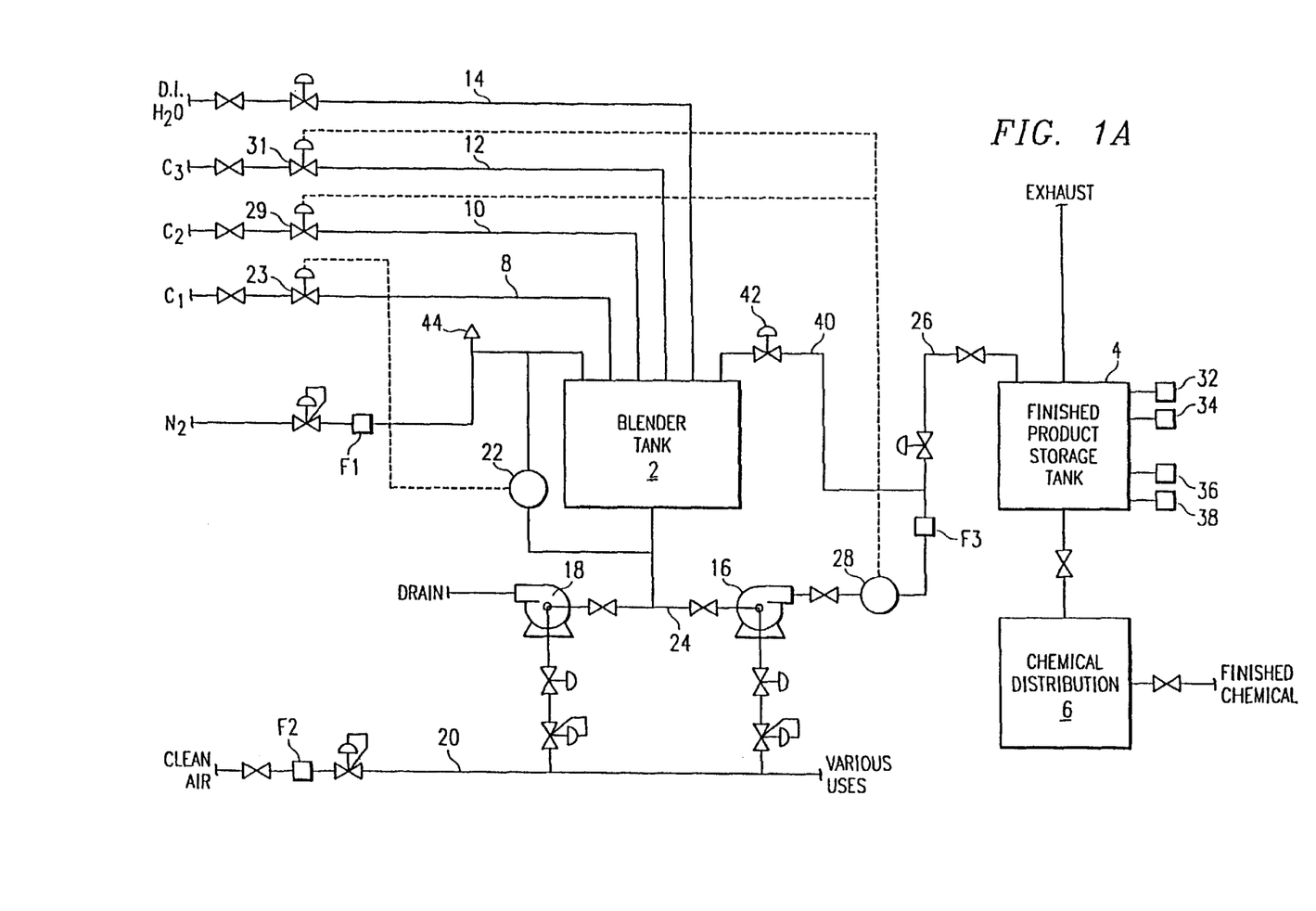
FIG. 1A is a schematic process flow diagram, in reduced scale, of a system in accordance with the present invention.

The numerous innovative teachings of the present application will be described with particular reference to the presently preferred embodiment (by way of example, and not of limitation), in which:

FIG. 1A is a schematic process flow diagram of a preferred system embodiment of the present invention. The main components of the system include a blender tank 2, a finished product storage tank 4, and a chemical distributor 6. First, second, and third chemicals C1, C2, and C3 enter the system via conduits 8, 10, and 12, respectively. Deionized water may enter through conduit 14. Conduits 8, 10, 12, and 14 terminate at blender tank 2, preferably as illustrated, although other piping arrangements may be beneficial.

Two pumps 16 and 18 are preferably positioned near blender tank 2. Pumps 16 and 18 are preferably air-driven using clean air supplied by conduit 20. Pump 18 serves as a drain pump, while pump 16 serves as a chemical mixture transfer pump, transferring chemical mixtures into finished product storage tank 4. Chemical mixture transfer pump 16 takes suction from conduit 24, and has a discharge conduit 26 leading from the discharge of pump 16 to tank 4.

A level is maintained in blender tank 2 by known methods and apparatus, such as a level sensing, indicating control unit 22, which has a programmed set-point level which is compared to the actual measured level. If the level is too low control unit 22 signals flow control valve 23 to direct more of chemical C1 into blender tank 2. Those skilled in the art will recognize other variations to accomplish level control.

An important aspect of the present invention resides in the provision of a sonic composition module 28, herein also referred to as an "SCM". SCM 28 measures the velocity of a sonic wave or pulse traversing through a chemical mixture which is in turn passing through discharge conduit 26. The velocity of the sonic pulse (sound velocity) through the chemical mixture is directly related to the concentration of C1 in C2, or more appropriately, the volume ratio of C1 to C2 in the chemical mixture of C1 and C2. In accordance with a set-point or target ratio, if the velocity is too low or too high, SCM 28 sends an appropriate electronic signal to one of several flow control valves, such as control valves 29 and 31 which regulate the flow of chemicals C2 and C3, respectively (the signal would only be sent to one of the control valves at a time so that the addition of chemicals to the mixture is sequential). This feed back control logic could be modified by a feed-forward master control loop, which would include, for example, components for sensing the purity or concentration of the chemicals C1, C2, and so on, up stream of control valves 23, 29, and 31 and the like. The actual purity or concentration could be compared to a set-point purity or concentration, and an appropriate signal "forwarded" to control valves 23, 29, or 31, to compensate for the purity change. Of course, care must be taken to use a sensing element which does not itself contribute unacceptable contaminants in the chemicals to be mixed.

A commercially available SCM, and one that is preferred for use in the systems and methods of the present invention, is that known under the trade designations "MODEL 88" and "88SCM", available from MESA LABORATORIES, INC., Nusonics Division, Wheat Ridge, Colo. As stated in the operations manual for this unit (which is hereby incorporated by reference), concentration output is a calculated value derived from a process model that takes into account the effects of both concentration and temperature, and optionally pressure on sound velocity in a fluid. Concentration can be expressed in a variety of units, including weight percent, density/specific gravity, and special units like °Brix or °Baume.

Preferred SCMs include two major assemblies, a transmitter and a transducer. A transmitter is typically installed within about 25 to about 100 feet of the transducer. The transducer is the wetted element of the SCM. It is installed in the process conduit, such as in conduit 26 as illustrated in FIG. 1. They may also be installed in a sampling loop. Preferred transducers have a velocity transducer and a temperature transducer, more preferably all in the same transducer body, which is welded, thus avoiding elastomeric seals which can fail under extremes of pressure, temperature, or in corrosive environments. Another preferred transducer is a "spool" design, wherein a spool having almost the same diameter as the conduit through which the chemical mixture is flowing is placed. The spool includes separate transit and receive transducers placed directly opposite one another, flush with the pipe wall, with a temperature transducer mounted separately. Both types of transducers are available in the SCM known under the trade designation "MODEL 88", from MESA LABORATORIES, discussed above.

As stated previously, a pressure transducer may be incorporated in the SCM used, but since pressure has only 0.01 meter/second/psi effect on sound velocity (as noted in the MESA LABS operations manual), the pressure transducer is rarely required.

The transmitter and transducer operate as described in the MESA manual cited above, which is hereby incorporated by reference.

Other important aspects of the invention include the provision of level controllers 32, 34, 36, and 38 on finished product storage tank 4. These are used to assure that batch mixing and input feed can be performed when needed, without any risk of overflow or exhaustion.

To use the system and methods of the present invention, in the presently preferred embodiment, one first selects the chemical liquids to be blended. A first chemical is then produced into a blender tank, at a known dilution. The volume of the first chemical is not particularly important, though of course overfilling the blender tank should be avoided. Then a second chemical to be blended with the first chemical is selected and produced into the blender tank. The blender tank comprises mixing means, for example a stirrer, baffles, vortex breaker and the like, sufficient to intimately mix the chemicals. A flow out of the blender tank is then commenced through a conduit leading to a finished product storage tank. A sonic concentration monitor ("SCM") is provided in the conduit which sends a sonic signal through the fluid mixture; the velocity of the sonic signal is measured, compared with a set-point or target mixture, and a signal is produced which directs one or more control valves to adjust flow of one of the chemicals, or deionized water, to produce the desired ratio of chemicals one and two. Third, fourth, and up to n chemicals are added to the blender tank in the same sequential manner, to produce second, third, and n−1 mixtures.

The invention is better understood with reference to the following examples, wherein all ratios and percentages are by weight unless otherwise specified.

EXAMPLE 1

In this example, an on-site blending unit is used for mixing of hydrofluoric acid (HF), nitric acid ($HNO_3$), and acetic acid ($CH_3COOH$ or HAc) in various volume ratios. The mix will be performed sequentially as follows:
1) Addition of 49% HF to empty blend tank
2) Addition of $HNO_3$ to the specified volume ratio
3) Final addition of HAc to the final volume ratio The most desirable approach for measuring and controlling compositions would be to utilize a Mesa Labs Model 88 sonic concentration monitor (SCM). Therefore, a preliminary check was performed to verify that there is a useful variation in sonic velocity with each sequential addition of the above components. (Of course, the additional measurements and mixing steps which are used to verify sensitivity would not be part of normal production use.)

Preliminary Check Procedure

The experiment was performed in accordance with section 4.3 of the Model 88 SCM Operation Manual. For this check procedure, a magnetic stirrer was used to minimize temperature gradients (although this would typically not be used in an ultrapure production facility). The experimental approach was as follows:
1) Addition of 49% HF (known velocity)
2) Add $HNO_3$ to (target volume ratio −5%) and measure velocity
3) Add $HNO_3$ to target volume ratio and measure velocity
4) Add $HNO_3$ to (target volume ratio +5%) and measure velocity
5) Add HAc to (target volume ratio −5%) and measure velocity
6) Add HAc to target volume ration and measure velocity
7) Add HAc to (target volume ration +5%) and measure velocity A standard 50.0 ml burette was used to measure component volumes. Two representative $HF:HNO_3:HAc$ solutions were selected for this test: the 6:1:5 product and the 3:1:2 product. The test was to verify a useful velocity/concentration slope at representative endpoints.

The first test was directed to volumetric ratios of $HF/HNO_3/HAc$ near 6:1:5, and the second test was directed to volumetric ratios near 3:1:2. The concentrations (% Weight) of the three acids used were: HF at 49%; nitric at 70%; and acetic at 99.5%.

In each case, sonic velocity was observed to increase with the addition of nitric acid and to decrease with the addition of acetic acid.

Preliminary Check Results with 6:1:5 Mixture

The results with the 6:1:5 mixture are as follows.

| Start | Addition | Cum.Δ | $V_{acou}$ | Temp ° C. |
|---|---|---|---|---|
| 110 ml HF | | | 1327.76 | 22.20 |
| | +10 ml $HNO_3$ | 10 nit | 1338.49 | 22.45 |
| | +7.3 ml $HNO_3$ | 17.3 nit | 1345.60 | 22.58 |
| | +1 ml $HNO_3$ | 18.3 nit | 1346.21 | 22.61 |
| | +0.9 ml $HNO_3$ | 19.2 nit | 1346.81 | 22.65 |

This shows a precisely controlled first stage of mixing semiconductor-grade chemicals. FIG. 2A is a plot, derived from this data, showing the relation between acoustic velocity and concentration. As this data shows, acoustic velocity provides a good one-dimensional measurement of concentration for mixtures in this range.

The product thus generated was then used in a second stage of mixing, in which the third component was admixed:

| Start | Addition | Cum.Δ | $V_{acou}$ | Temp ° C. |
|---|---|---|---|---|
| 100 ml | | | 1346.81 | |
| HF + $HNO_3$ | +30 ml HAc | 49.2 | 1316.53 | 21.30 |
| | +10 ml HAc | 59.2 | 1309.09 | 21.28 |
| | +28 ml HAc | 87.1 | 1293.95 | 21.00 |
| | +3.6 ml HAc | 90.7 | 1292.02 | 21.15 |
| | +3.5 ml HAc | 94.2 | 1290.22 | 21.2 |

FIG. 2B is a plot, derived from this data, showing the relation between acoustic velocity and concentration. As this data shows, acoustic velocity provides a good one-dimensional measurement of concentration for mixtures in this range. Thus the combination of two sequential mixing steps permits the concentrations of a three-component mixture to be accurately measured with a one-dimensional sensor (acoustic velocity sensing).

Preliminary Check Results with 3:1:2 Mixture

The results with the 3:1:2 mixture are as follows.

| Start | Addition | Cum.Δ | $V_{acou}$ | Temp ° C. |
|---|---|---|---|---|
| 110 ml HF | | | 1329.69 | |
| | +30 ml $HNO_3$ | 30 nit | 1355.39 | 27.9 |
| | +8 ml $HNO_3$ | 38 | 1361.08 | 22.95 |
| | +2 ml $HNO_3$ | 40 | 1362.46 | 22.93 |
| | +2 ml $HNO_3$ | 42 | 1363.84 | 22.93 |

This shows a precisely controlled first stage of mixing semiconductor-grade chemicals. FIG. 2C is a plot, derived from this data, showing the relation between acoustic velocity and concentration. As this data shows, acoustic velocity provides a good one-dimensional measurement of concentration for mixtures in this range.

The product thus generated was then used in a second stage of mixing, in which the third component was admixed:

| Start | Addition | Cum.Δ | $V_{acou}$ | Temp ° C. |
|---|---|---|---|---|
| 100 ml 3:1 | +30 ml HAc | 72 | 1320.09 | 21.1 |
| $HF:HNO_3$ | +18 ml HAc | 89.6 | 1315.18 | 20.88 |
| | +2.5 ml HAc | 92 | 1313.31 | 20.95 |
| | +2.5 ml HAc | 94.6 | 1311.6 | 21 |

FIG. 2D is a plot, derived from this data, showing the relation between acoustic velocity and concentration. As this data shows, acoustic velocity provides a good one-dimensional measurement of concentration for mixtures in this range. Thus the combination of two sequential mixing steps permits the concentrations of a three-component mixture to be accurately measured with a one-dimensional sensor (acoustic velocity sensing).

Sensitivity of Measurement

The slope of each plot over the concentration ranges considered are given in the following table. Each slope is significantly greater than that required by the Model 88's 0.1 nm/s repeatability specification.

Slopes

NITRIC TO 6:1:5 PRODUCT . . . m1=1.165 (m/sec per 0.1-part)
ACETIC TO 6:1:5 PRODUCT . . . m2=−3.655 (m/sec per 0.1-part)
NITRIC TO 3:1:2 PRODUCT . . . m3=2.76 (m/sec per 0.1-part)
ACETIC TO 3:1:2 PRODUCT . . . m4=−3.58 (m/sec per 0.1-part)

Although no direct measurement of heat of reaction data was available, the maximum temperature rise observed was approximately 0.4 degrees Celsius. Heat of reaction is not expected to be a significant factor. (Note: A typical acidic system temperature coefficient provided by Mass Labs for the Model 88 is 2 to 4 m/s per degree Celsius). Although heat of reaction is small, temperature adjustment capability in the installed unit is desirable.

EXAMPLE 2

A second three-component system useful in semiconductor processing is the various dilutions of buffered hydrofluoric acid. In this system, the ingredients are aqueous HF, $NH_4F$, and ultrapure (DI) water.

In this class of embodiments, the aqueous HF and the aqueous ammonium fluoride are preferably both generated on-site at a semiconductor production facility, using systems and methods like those described in provisional 60/018,104 filed Jul. 7, 1995, which is hereby incorporated by reference. In this embodiment ultrapure gaseous HF is first produced, and ultrapure aqueous HF is then generated (to a concentration measured by acoustic velocity sensing, or by conductivity measurement for dilute solutions). Ultrapure gaseous ammonia is separately generated, and then the gaseous ammonia is bubbled into the ultrapure aqueous HF, under control of a one-dimensional sensor output, to generate buffered HF of the desired strength. Thus again two sequential combination steps provide precise control of a three-component mixture. The individual steps in this process will now be described in great detail. Note that all of these steps are performed on-site at a semiconductor production facility, in this embodiment.

Purification of $NH_3$

In accordance with this invention, ammonia vapor is first drawn from the vapor space in a liquid ammonia supply reservoir. Drawing vapor in this manner serves as a single-stage distillation, leaving certain solid and high-boiling impurities behind in the liquid phase. The supply reservoir can be any conventional supply tank or other reservoir suitable for containing ammonia, and the ammonia can be in anhydrous form or an aqueous solution. The reservoir can be maintained at atmospheric pressure or at a pressure above atmospheric if desired to enhance the flow of the ammonia through the system. The reservoir is preferably heat controlled, so that the temperature is within the range of from about 10° to about 50° C., preferably from about 15° to about 35° C., and most preferably from about 20° to about 25° C.

Impurities that will be removed as a result of drawing the ammonia from the vapor phase include metals of Groups I and II of the Periodic Table, as well as aminated forms of these metals which form as a result of the contact with ammonia. Also rejected will be oxides and carbonates of these metals, as well as hydrides such as beryllium hydride and magnesium hydride; Group III elements and their oxides, as well as ammonium adducts of hydrides and halides of these elements: transition metal hydrides; and heavy hydrocarbons and halocarbons such as pump oil.

The ammonia drawn from the reservoir is passed through a filtration unit to remove any solid matter entrained with the vapor. Microfiltration and ultrafiltration units and membranes are commercially available and can be used. The grade and type of filter will be selected according to need. The presently preferred embodiment uses a gross filter, followed by a 0.1 micron filter, in front of the ionic purifier, and no filtration after the ionic purifier.

The filtered vapor is then passed to a scrubber in which the vapor is scrubbed with high-pH purified (preferably deionized) water. The high-pH water is preferably an aqueous ammonia solution, with the concentration raised to saturation by recycling through the scrubber. The scrubber may be conveniently operated as a conventional scrubbing column in countercurrent fashion. Although the operating temperature is not critical, the column is preferably run at a temperature ranging from about 10° to about 50° C., preferably from about 15° to about 35° C. Likewise, the operating pressure is not critical, although preferred operation will be at a pressure of from about atmospheric pressure to about 30 psi above atmospheric. The column will typically contain a conventional column packing to provide for a high degree of contact between liquid and gas, and preferably a mist removal section as well.

In one presently preferred example, the column has a packed height of approximately 3 feet (0.9 meter) and an internal diameter of approximately 7 inches (18 cm), to achieve a packing volume of 0.84 cubic feet (24 liters), and is operated at a pressure drop of about 0.3 inches of water (0.075 kPa) and less than 10% flood, with a recirculation flow of about 2.5 gallons per minute (0.16 liter per second) nominal or 5 gallons per minute (0.32 liter per second) at 20% flood, with the gas inlet below the packing, and the liquid inlet above the packing but below the mist removal section. Preferred packing materials for a column of this description are those which have a nominal dimension of less than one-eighth of the column diameter. The mist removal section of the column will have a similar or more dense packing, and is otherwise conventional in construction. It should be understood that all descriptions and dimensions in this paragraph are examples only. Each of the system parameters may be varied.

In typical operation, startup is achieved by first saturating deionized water with ammonia to form a solution for use as the starting scrubbing medium. During operation of the scrubber, a small amount of liquid in the column sump is drained periodically to remove accumulated impurities.

Examples of impurities that will be removed by the scrubber include reactive volatiles such as silane ($SiH_4$) and arsine ($AsH_3$); halides and hydrides of phosphorus, arsenic, and antimony; transition metal halides in general; and Group III and Group VI metal halides and hydrides.

The units described up to this point may be operated in either batchwise, continuous, or semi-continuous manner.

Continuous or semi-continuous operation is preferred. The volumetric processing rate of the ammonia purification system is not critical and may vary widely. In most operations for which the present invention is contemplated for use, however, the flow rate of ammonia through the system will be within the range of about 200 cc/h to thousands of liters per hour.

Optionally the ammonia leaving the scrubber can be further purified prior to use, depending on the particular type of manufacturing process for which the ammonia is being purified. When the ammonia is intended for use in chemical vapor deposition, for example, the inclusion of a dehydration unit and a distillation unit in the system will be beneficial. The distillation column may also be operated in either batchwise, continuous, or semi-continuous manner. In a batch operation, a typical operating pressure might be 300 pounds per square inch absolute (2,068 kPa), with a batch size of 100 pounds (45.4 kg). The column in this example has a diameter of 8 inches (20 cm), a height of 72 inches (183 cm), operating at 30% of flood, with a vapor velocity of 0.00221 feet per second (0.00067 meter per second), a height equivalent to a theoretical plate of 1.5 inches (3.8 cm), and 48 equivalent plates. The boiler size in this example is about 18 inches (45.7 cm) in diameter and 27 inches (68.6 cm) in length, with a reflux ratio of 0.5, and recirculating chilled water enters at 60° F. (15.6° C.) and leaves at 90° F. (32.2° C.). Again, this is merely an example; distillation columns varying widely in construction and operational parameters can be used.

Depending on its use, the purified ammonia, either with or without the distillation step, may be used as a purified gas or as an aqueous solution, in which case the purified ammonia is dissolved in purified (preferably deionized) water. The proportions and the means of mixing are conventional.

A flow chart depicting one example of an ammonia purification unit in accordance with this invention is shown in FIG. 1. Liquid ammonia is stored in a reservoir 11. Ammonia vapor 12 is drawn from the vapor space in the reservoir, then passed through a shutoff valve 13, then through a filter 14. The filtered ammonia vapor 15, whose flow is controlled by a pressure regulator 16, is then directed to a scrubbing column 17 which contains a packed section 18 and a mist removal pad 19. Saturated aqueous ammonia 20 flows downward as the ammonia vapor flows upward, the liquid being circulated by a circulation pump 21, and the liquid level controlled by a level sensor 22. Waste 23 is drawn off periodically from the retained liquid in the bottom of the scrubber. Deionized water 24 is supplied to the scrubber 17, with elevated pressure maintained by a pump 25. The scrubbed ammonia 26 is directed to one of three alternate routes. These are:

(1) A distillation column 27 where the ammonia is purified further. The resulting distilled ammonia 28 is then directed to the point of use.
(2) A dissolving unit 29 where the ammonia is combined with deionized water 30 to form an aqueous solution 31, which is directed to the point of use. For plant operations with multiple points of use, the aqueous solution can be collected in a holding tank from which the ammonia is drawn into individual lines for a multitude of point-of-use destinations at the same plant.
(3) A transfer line 32 which carries the ammonia in gaseous form to the point of use.

The second and third of these alternatives, which do not utilize the distillation column 27, are suitable for producing ammonia with less than 100 parts per trillion of any metallic impurity. For certain uses, however, the inclusion of the distillation column 27 is preferred. Examples are furnace or chemical vapor deposition (CVD) uses of the ammonia. If the ammonia is used for CVD, for example, the distillation column would remove non-condensables such as oxygen and nitrogen, that might interfere with CVD. In addition, since the ammonia leaving the scrubber 17 is saturated with water, a dehydration unit may be incorporated into the system between the scrubber 17 and the distillation column 27, as an option, depending on the characteristics and efficiency of the distillation column.

With any of these alternatives, the resulting stream, be it gaseous ammonia or an aqueous solution, may be divided into two or more branch streams, each directed to a different use station, the purification unit thereby supplying purified ammonia to a number of use stations simultaneously.

Purification of HF

Figure 4:
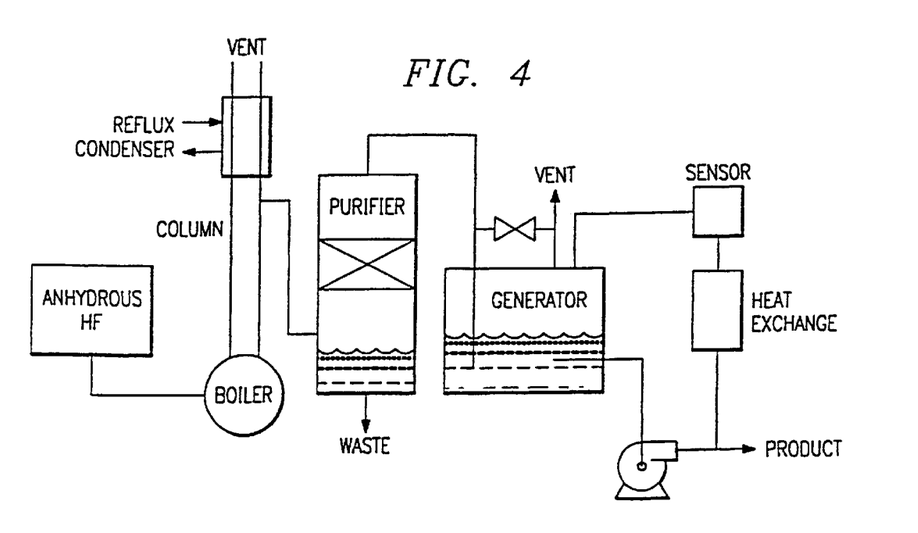
FIG. 4 shows an on-site HF purifier according to a sample embodiment of the disclosed innovations.
Figure 5:
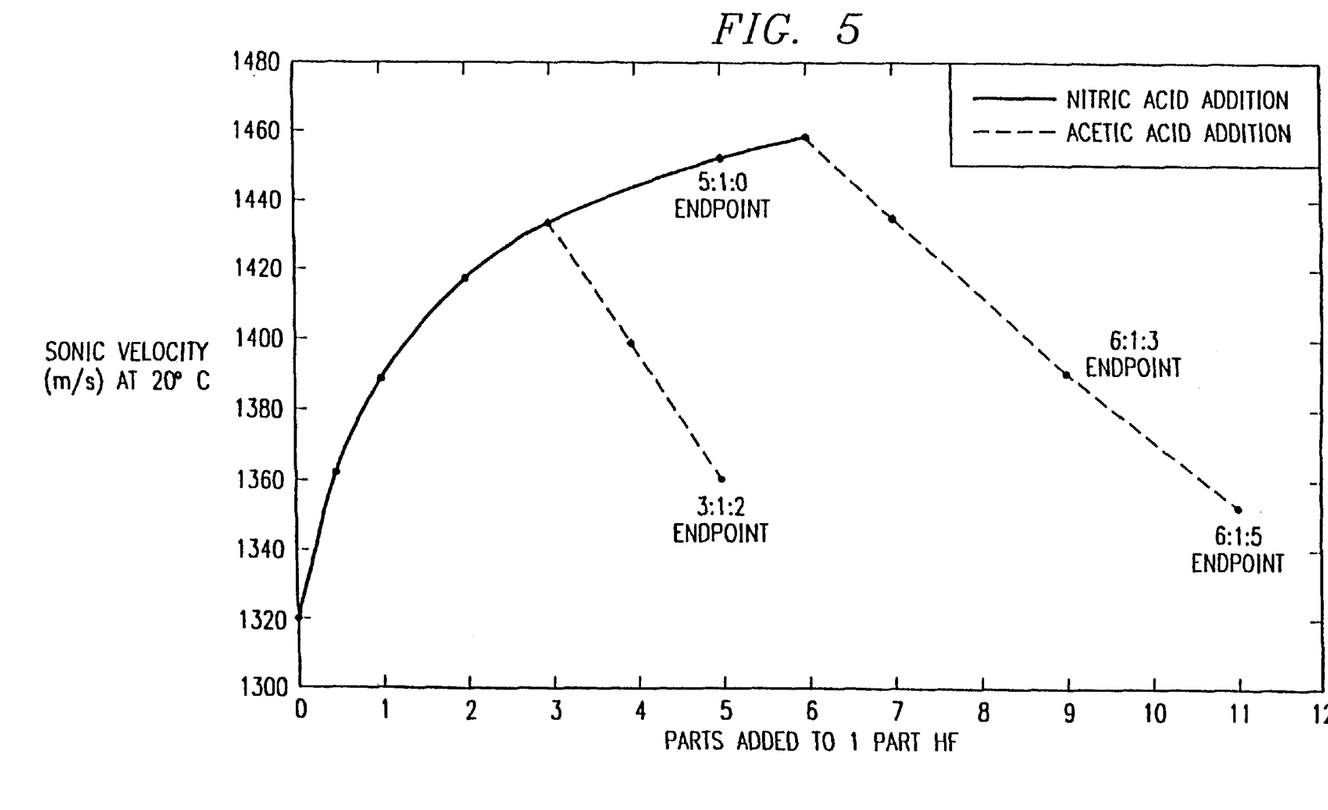
FIG. 5 shows the effect on the sonic velocity of a mixture of HF, $HNO_3$, and HAc as $HNO_3$ and HAc are added sequentially to a volume of HF of known concentration and velocity. $HNO_3$ is added first, to a specified volume ratio. HAc is then added to the final specified volume ratio. The final volume ratios of the solutions tested were 6:1:5 and 3:1:2 ($HF:HNO_3:HAc$). The sonic velocity of the mixture was observed to increase with the addition of $HNO_3$ and decrease with the addition of HAc.
Figure 6:
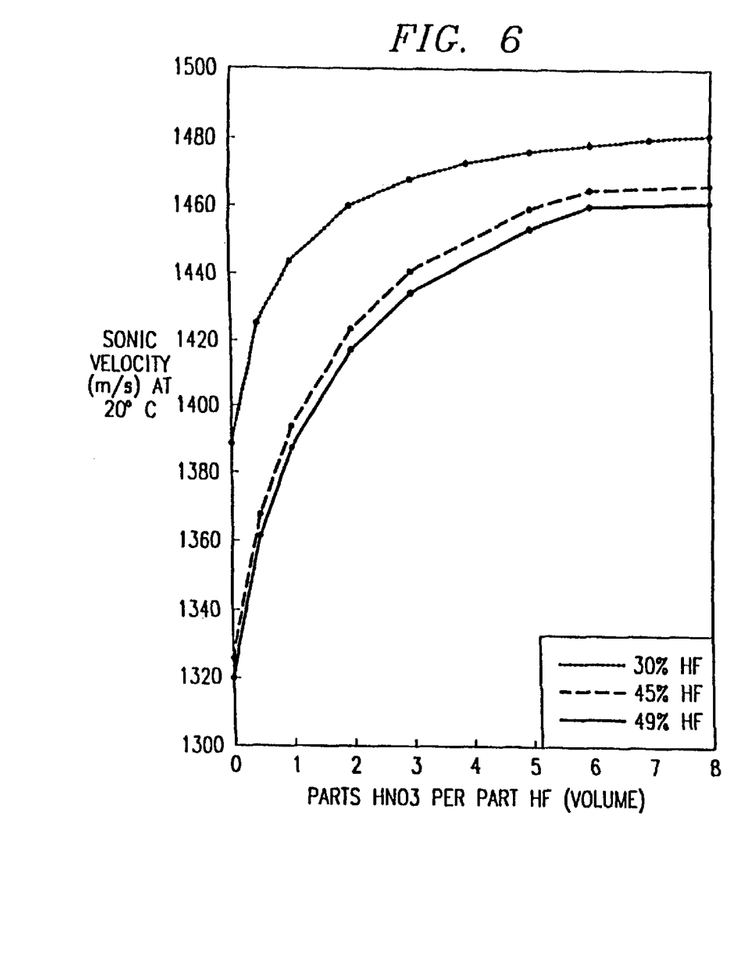
FIG. 6 shows the effect on the sonic velocity of a concentration of $HNO_3$ as concentrations of HF are added in three separate trials. Sonic velocity is the greatest when the ratio of $HNO_3$ to HF is the greatest.
Figure 7:
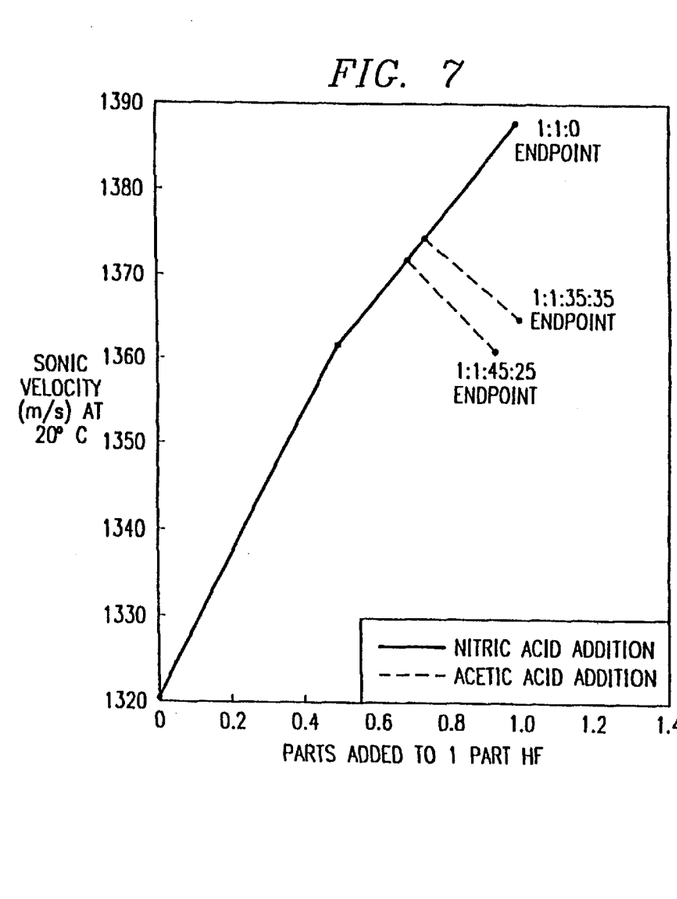
FIG. 7 shows the effect on the sonic velocity of a known concentration of HF as nitric and acetic acids are sequentially added. Sonic velocity was measured to increase as nitric acid was added, but decrease with a sequential addition of acetic acid.

FIG. 4 shows an on-site HF purifier according to a sample embodiment of the disclosed innovations.

The starting material is preferably high-purity 49% HF which is essentially arsenic-free. Such low-arsenic material is available from Allied Chemical.

The HF process flow includes an evaporation (and arsenic removal) stage, a fractionating column to remove most other impurities, an Ionic Purifier column to suppress contaminants not removed by the fractionating column, and finally the HF Supplier (HFS).

Optionally a batch process arsenic removal step can be combined with the evaporator. In this alternative, arsenic will be converted to the +5 state and held in the evaporator during distillation by the addition of an oxidant ($KMnO_4$ or $(NH_4)_2S_2O_8$) and a cation source such as $KHF_2$ to form the salt $K_2AsF_7$. This will be a batch process as this reaction is slow and sufficient time for completion must be allowed before the distillation takes place. This process requires contact times of approximately 1 hr at nominal temperatures. To achieve complete reaction in a continuous process would require high temperatures and pressures (undesirable for safety) or very large vessels and piping. In this process the HF would be introduced into a batch process evaporator vessel and would be treated with an oxidant while stirring for a suitable reaction time.

The HF is then distilled in a fractionating column with reflux thus removing the bulk of the metallic impurities. Elements showing significant reduction at this step include:

| | |
|---|---|
| Group (I) | Na, |
| Group 2 (II) | Ca, Sr, Ba, |
| Groups 3–12 (IIIA–IIA) | Cr, W, Mo, Mn, Fe, Cu, Zn |
| Group 13 (III) | Ga, |
| Group 14 (IV) | Sn, Pb, and |
| Group 15 (VII) | Sb. |

This fractionating column acts as a series of many simple distillations; this is achieved by packing the column with a high surface area material with a counter current liquid flow thus ensuring complete equilibrium between the descending liquid and rising vapor. Only a partial condenser will be installed in this column to provide reflux and the purified gaseous HF will then be conducted to the HF Ionic Purifier (HF IP). The HF at this stage is pure by normal standards, except for the possible carry over of the arsenic treatment chemicals or the quench required to remove these chemicals.

The HF IP will be utilized as an additional purity guarantee prior to introduction of the HF gas into the supplier systems. These elements may be present in the treatment solution or introduced in the IP to absorb sulfate carried over in the HF stream. IP testing has demonstrated significant reductions in the HF gas stream contamination for the following elements:

| | |
|---|---|
| Group 2 (II) | Sr, and Ba, |
| Groups 6–12 (VIA–IIA) | Cr, W, and Cu, |
| Group 13 (III) | B, |
| Group 14 (IV) | Pb, Sn, and |
| Group 15 (V) | Sb. |

Many of these elements are useful in addressing the As contamination suppression. Any carry over in the distillation column arising from their excess in the As treatment can be rectified at this step.

Generation of Buffered HF

Figure 3A:
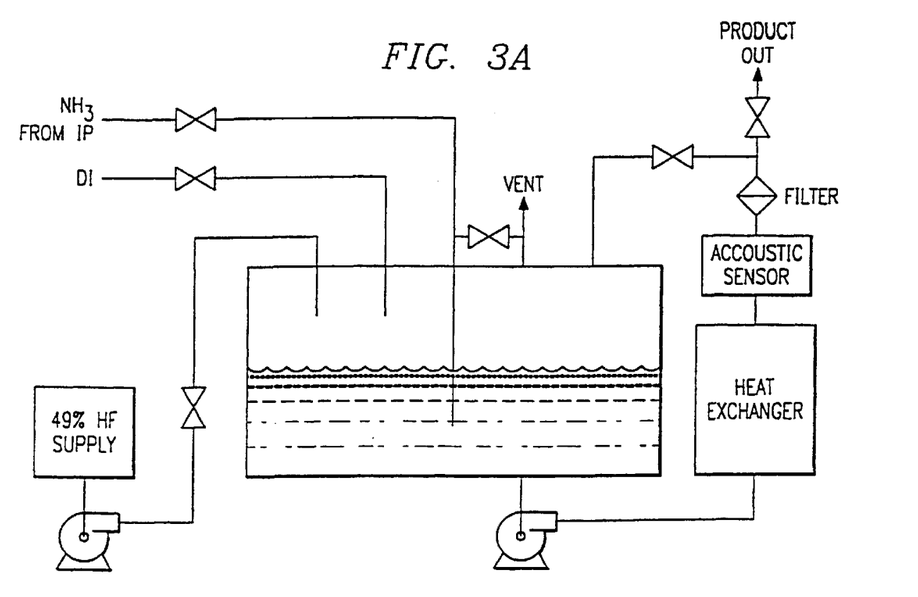
FIG. 3A shows an overview of the process flow in a generation unit in which ultrapure ammonia is introduced into hydrofluoric acid to produce buffered-HF.
Figure 3B:
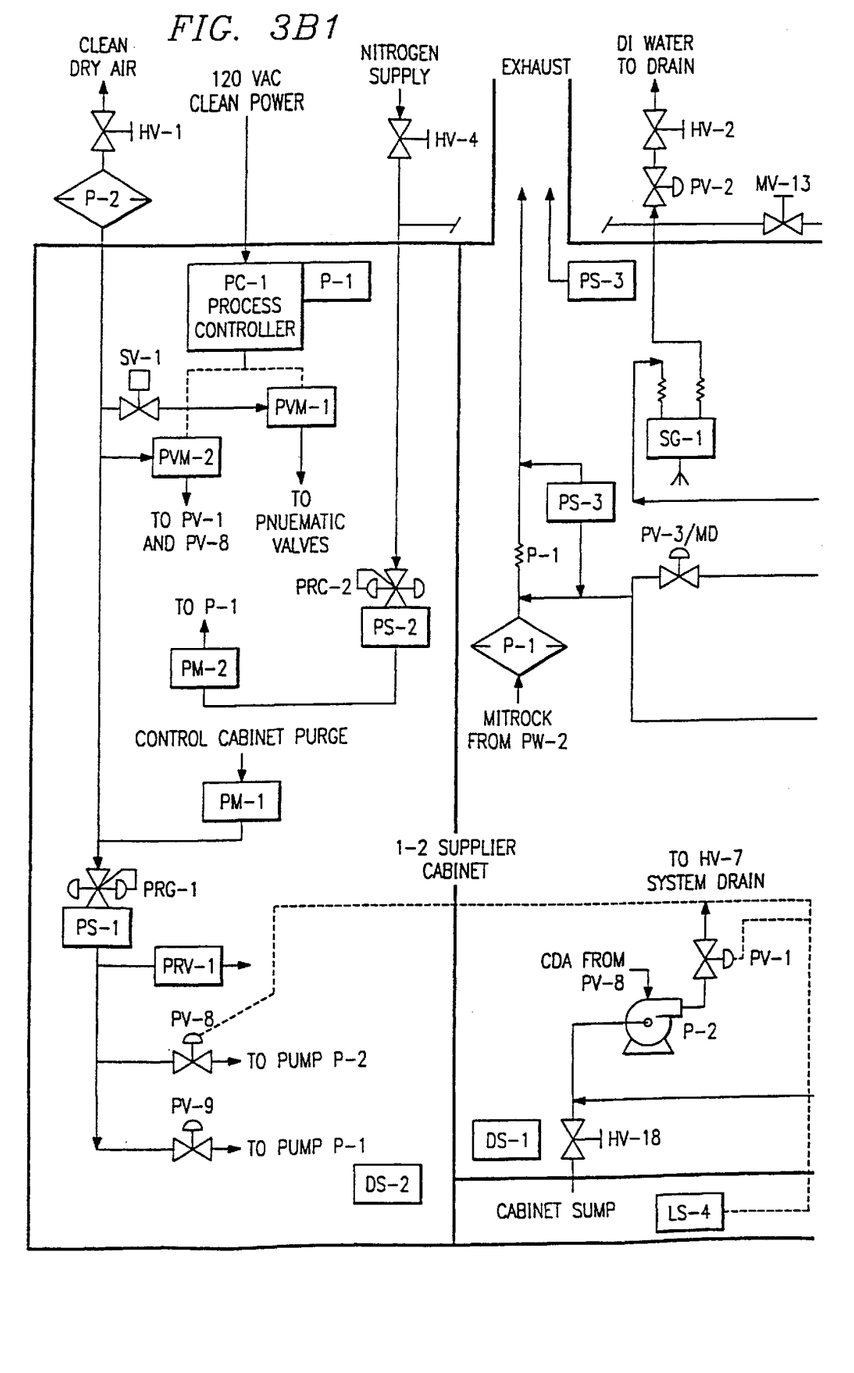
Figure 3B:
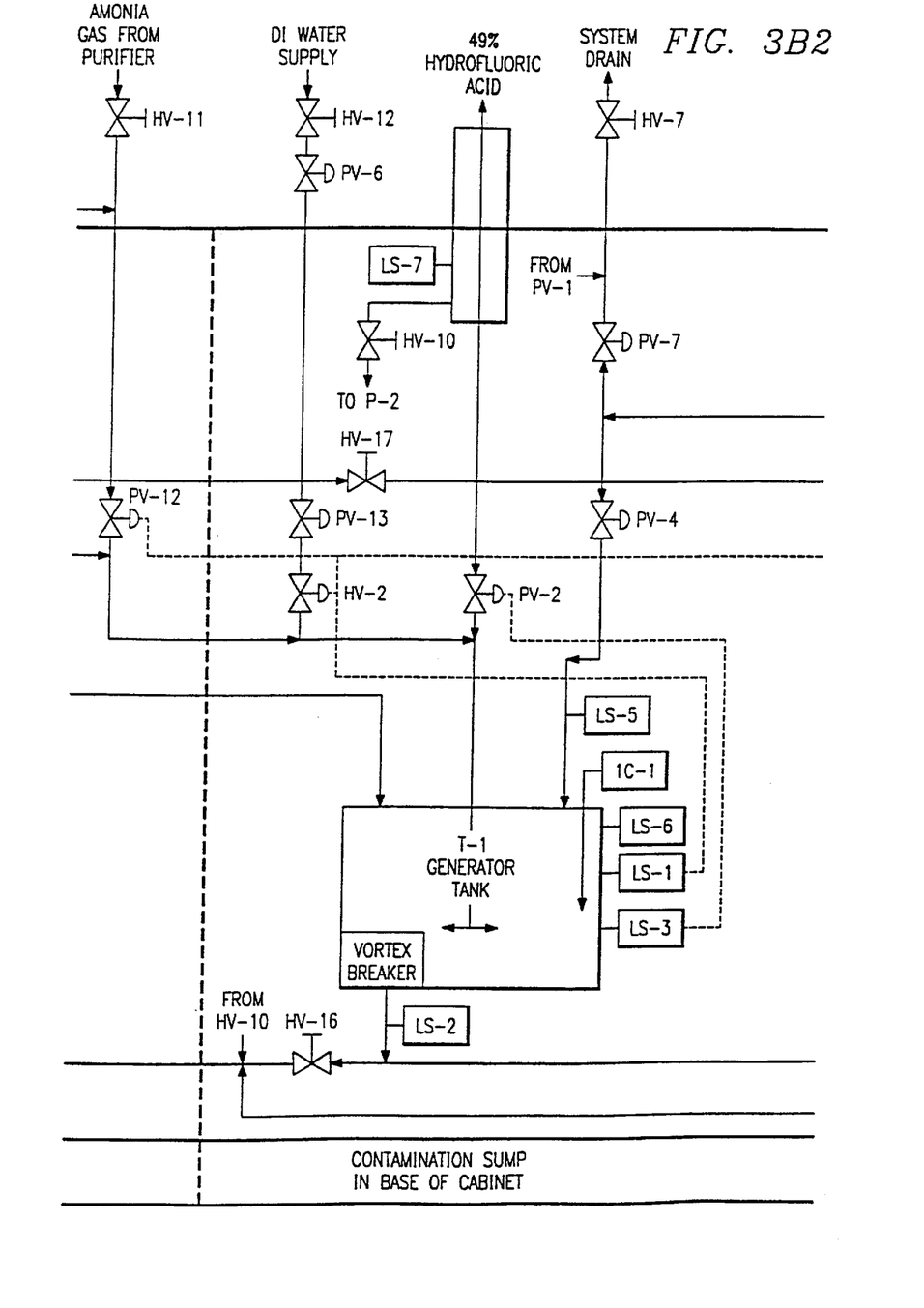
Figure 3B:
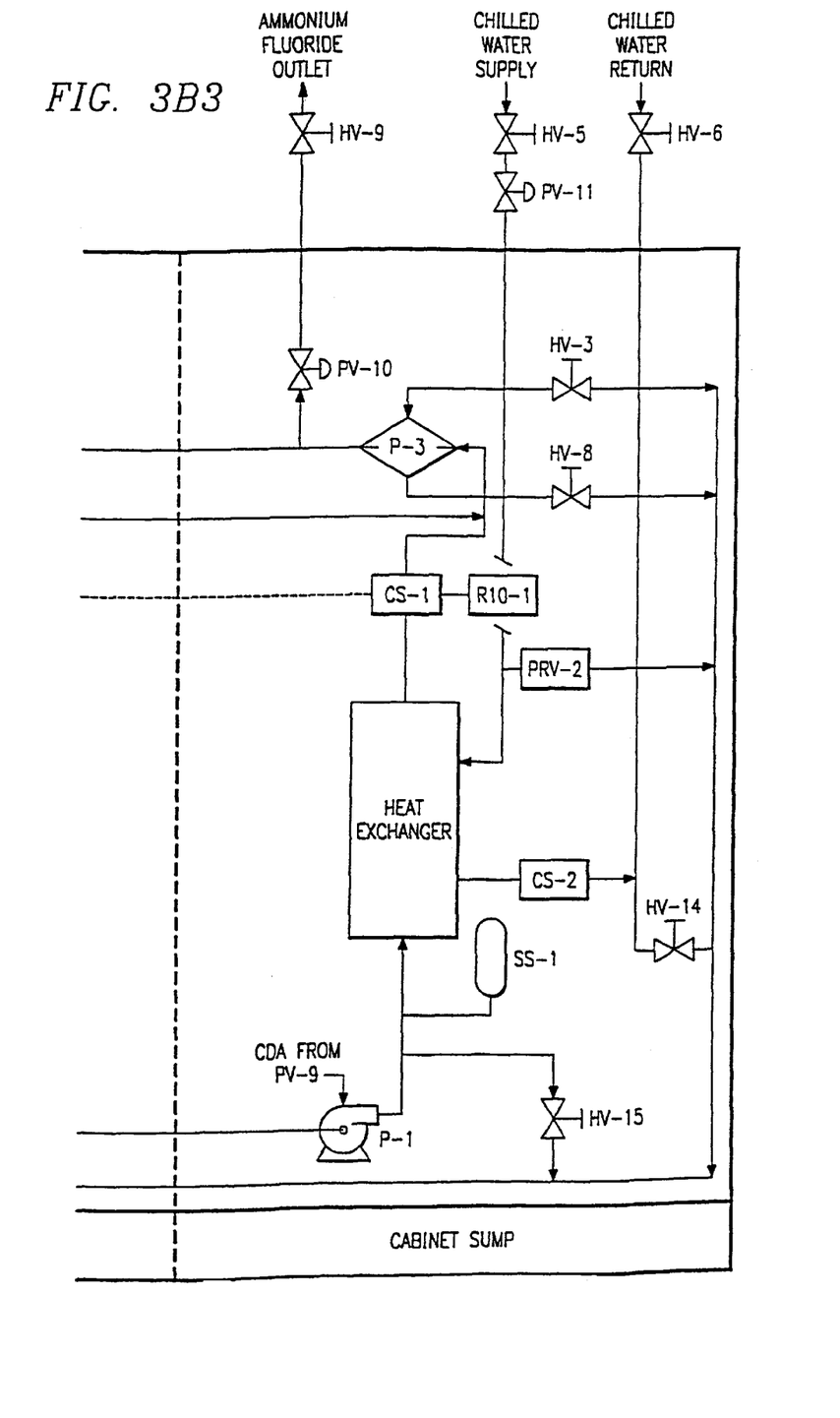

FIG. 3A shows an overview of the process flow in a generation unit in which ultrapure ammonia is introduced into hydrofluoric acid to produce buffered-HF. and FIGS. 3B1–3B3 show detailed P&ID diagrams of a sample implementation of the process flow of FIG. 3A.

An important feature of this is that certain metal impurities (e.g. Fe and Ni) are slower to dissolve from the vapor stream than HF is. A two-stage process is therefore used, in which some impurities are dissolved in a first scrubber, while a second scrubber is operated at about 105% of saturation, so that these "light" impurities go off at the top of the column. Thus the second scrubber produces high-purity hydrofluoric acid.

In the presently preferred embodiment, the liquid volume of the ammonia purifier is 10 l. and the maximum gas flow rate is about 10 standard l/min. The scrubbing liquid is purged—continuous or incrementally—sufficiently to turn over at least once in 24 hrs Product concentration (at both generation steps) is measured using acoustic velocity measurement equipment (from Mesa Labs) to measure concentration—but alternatively measurements could be performed using conductivity, density, index of refraction, or IR spectroscopy.

To set up the process one must determine the concentration of total HF and $NH_3$ to be dissolved in water. For example, 1 kg. of 40% by weight ammonium, fluoride solution would contain 400 g of $NH_4F$ and 600 g of ultra pure water. Since the mole ratio of HF to $NH_3$ is 1:1 for pure $NH_4F$ the 400 g of $NH_4F$ would include 216 g of anhydrous HF and 184 g of anhydrous $NH_3$. (MW $NH_4F$ 237, MW HF=20, MW $NH_3$–17).

At the completion of the HF formation cycle 216 g of HF is dissolved in 600 g of water or 26.5% by weight. The on-board instrumentation is sent to add HF to their concentration. Alternatively, 49% HF can be diluted to this concentration.

After the 26.5% HF solution is formed 189 g of $NH^3$ is added to form the 40% $NH_4F$ solution.

Other concentration and mole ratios may be set by the concentration instrumentation for different application by adjustment of the concentration instrumentation.

Wafer Cleaning

Figure 2:
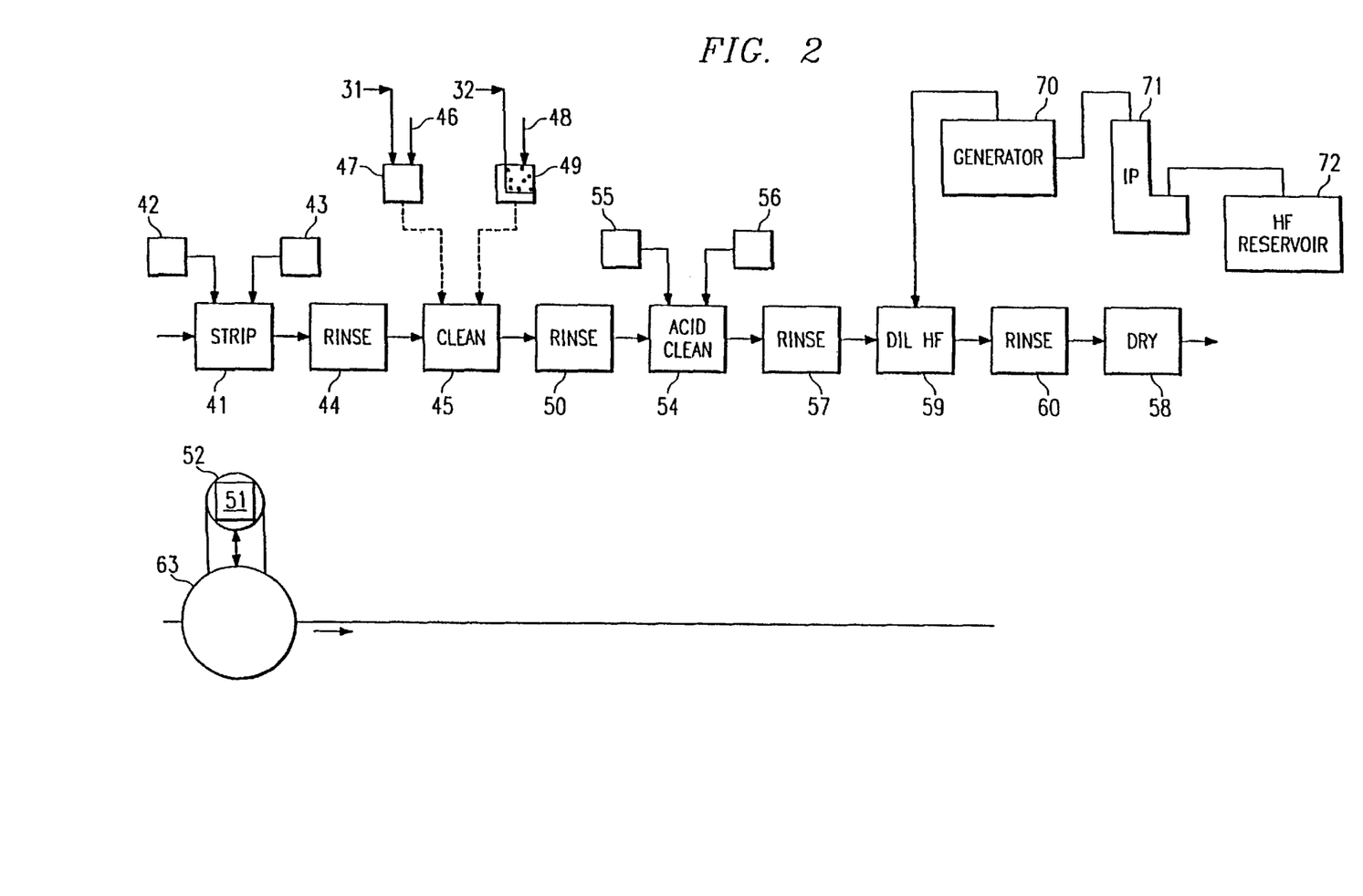
FIG. 2 is a block diagram of a semiconductor fabrication line in which the ammonia purification of FIG. 1 may be incorporated.
Figure 2A:
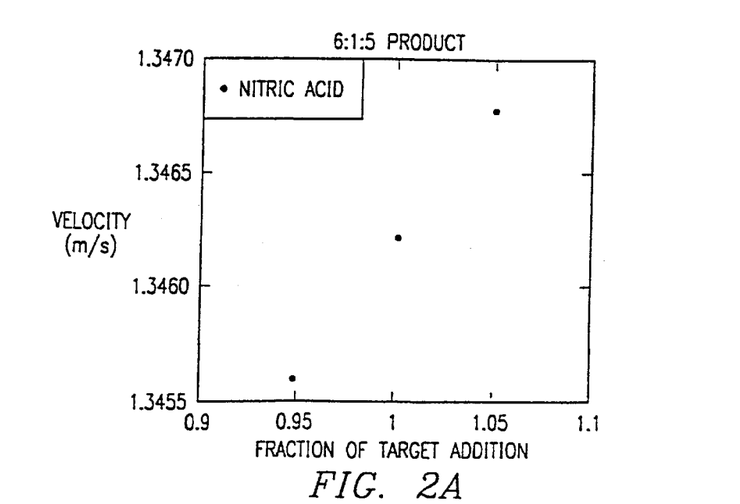
FIGS. 2A–2D are graphs illustrating the velocity vs. concentration for mixing of specific fluids discussed in the Examples in accordance with the invention.
Figure 2B:
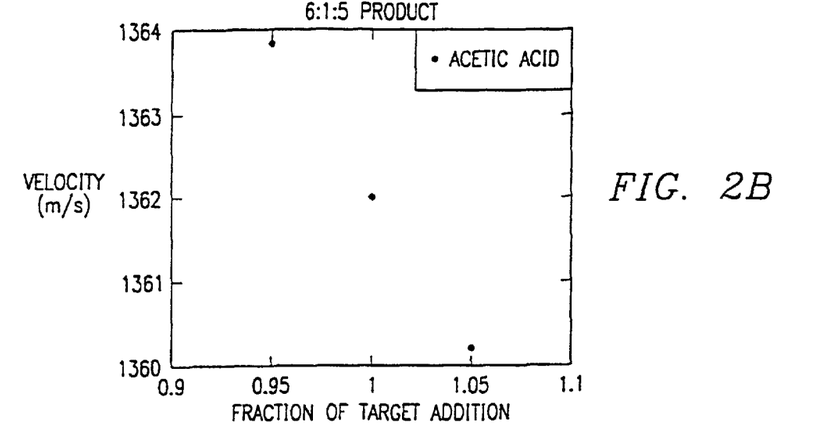
Figure 2C:
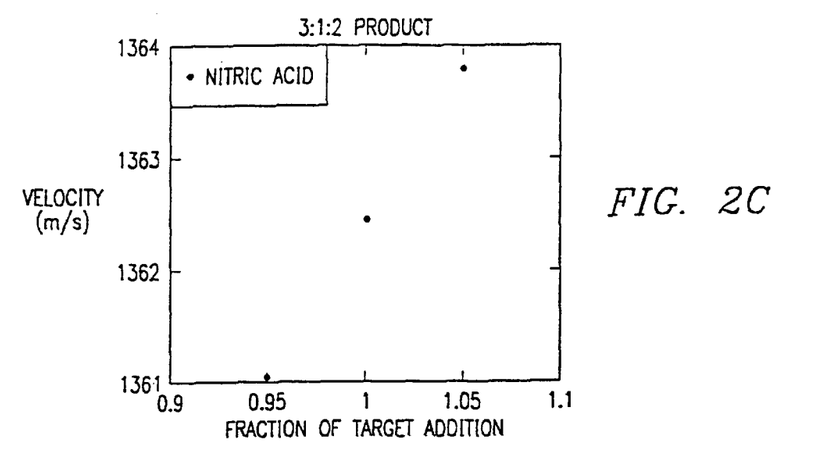
Figure 2D:
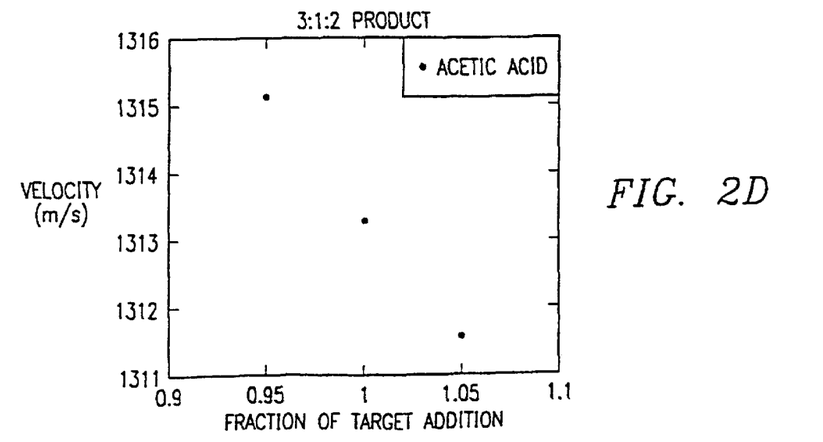

Some cleanup stations in a conventional line for semiconductor fabrication are depicted in FIG. 2. The first unit in the cleaning line is a resist stripping station 41 where aqueous hydrogen peroxide 42 and sulfuric acid 43 are combined and applied to the semiconductor surface to strip off the resist. This is succeeded by a rinse station 44 where deionized water is applied to rinse off the stripping solution. Immediately downstream of the rinse station 44 is a cleaning station 45 where an aqueous solution of ammonia and hydrogen peroxide are applied. This solution is supplied in one of two ways. In the first, aqueous ammonia 31 is combined with aqueous hydrogen peroxide 46, and the resulting mixture 47 is directed to the cleaning station 45. In the second, pure gaseous ammonia 32 is bubbled into an aqueous hydrogen peroxide solution 48 to produce a similar mixture 49, which is likewise directed to the cleaning station 45. Once cleaned with the ammonia/hydrogen peroxide combination, the semiconductor passes to a second rinse station 50 where deionized water is applied to remove the cleaning solution. The next station is a further cleaning station 54 where aqueous solutions of hydrochloric acid 55 and hydrogen peroxide 56 are combined and applied to the semiconductor surface for further cleaning. This is followed by a final rinse station 57 where deionized water is applied to remove the HCl and $H_2O_2$. At deglaze station 59 dilute buffered HF is applied to the wafer (for removal of native or other oxide film). The dilute buffered hydrofluoric acid is supplied directly, through sealed piping, from the generator 70. As described above, the reservoir 72 holds anhydrous HF, from which a stream of gaseous HF is fed through the ionic purifier 71 into generator 70. Preferably gaseous ammonia is also bubbled into generator 70 to provide a buffered solution, and ultrapure deionized water is added to achieve the desired dilution. This is followed by a rinse in ultrapure deionized water (at station 60), and drying at station 58. The wafer or wafer batch 61 will be held on a wafer support 52, and conveyed from one workstation to the next by a robot 63 or some other conventional means of achieving sequential treatment. The means of conveyance may be totally automated, partially automated or not automated at all.

The system shown in FIG. 2 is just one example of a cleaning line for semiconductor fabrication. In general, cleaning lines for high-precision manufacture can vary widely from that shown in FIG. 2, either eliminating one or more of the units shown or adding or substituting units not shown. The concept of the on-site preparation of high-purity aqueous ammonia, however, in accordance with this invention is applicable to all such systems.

The use of ammonia and hydrogen peroxide as a semiconductor cleaning medium at workstations such as the cleaning station 45 shown in FIG. 2 is well known throughout the industry. While the proportions vary, a nominal system would consist of deionized water, 29% ammonium hydroxide (weight basis) and 30% hydrogen peroxide (weight basis), combined in a volume ratio of 6:1:1. This cleaning agent is used to remove organic residues, and, in conjunction with ultrasonic agitation at frequencies of approximately 1 MHz, removes particles down to the sub-micron size range.

In one class of embodiments, the purification (or purification and generation) system is positioned in close proximity to the point of use of the ultrapure chemical in the production line, leaving only a short distance of travel between the purification unit and the production line. Alternatively, for plants with multiple points of use, the ultrapure chemical from the purification (or purification and generation) unit may pass through an intermediate holding tank before reaching the points of use. Each point of use will then be fed by an individual outlet line from the holding tank. In either case, the ultrapure chemical can therefore be directly applied to the semiconductor substrate without packaging or transport and without storage other than a small in-line reservoir, and thus without contact with the potential sources of contamination normally encountered when chemicals are manufactured and prepared for use at locations external to the manufacturing facility. In this class of embodiments, the distance between the point at which the ultrapure chemical leaves the purification system and its point of use on the production line will generally be a few meters or less. This distance will be greater when the purification system is a central plant-wide system for piping to two or more use stations, in which case the distance may be two thousand feet or greater. Transfer can be achieved through an ultra-clean transfer line of a material which does not introduce contamination. In most applications, stainless steel or polymers such as high density polyethylene or fluorinated polymers can be used successfully.

Due to the proximity of the purification unit to the production line, the water used in the unit can be purified in accordance with semiconductor manufacturing standards. These standards are commonly used in the semiconductor industry and well known among those skilled in the art and experienced in the industry practices and standards. Methods of purifying water in accordance with these standards include ion exchange and reverse osmosis. Ion exchange methods typically include most or all of the following units: chemical treatment such as chlorination to kill organisms; sand filtration for particle removal; activated charcoal filtration to remove chlorine and traces of organic matter: diatomaceous earth filtration; anion exchange to remove strongly ionized acids; mixed bed polishing, containing both cation and anion exchange resins to remove further ions; sterilization, involving chlorination or ultraviolet light; and filtration through a filter of 0.45 micron or less. Reverse osmosis methods will involve, in place of one or more of the units in the ion exchange process, the passage of the water under pressure through a selectively permeable membrane which does not pass many of the dissolved or suspended substances. Typical standards for the purity of the water resulting from these processes are a resistivity of at least about 15 megohm-cm at 25° C. (typically 18 megohm-cm at 25° C.), less than about 25 ppb of electrolytes, a particulate content of less than about $150/cm^3$ and a particle size of less than 0.2 micron, a microorganism content of less than about $10/cm^3$, and total organic carbon of less than 100 ppb.

In the process and system of this invention, a high degree of control over the product concentration and hence the flow rates is achieved by precise monitoring and metering using known equipment and instrumentation. A convenient means of achieving this is by acoustic velocity sensing. Other methods will be readily apparent to those skilled in the art. Various modifications of the concentration control loop (using conductivity, etc., in place of acoustic velocity) can be implemented if desired.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, the disclosed ideas can be adapted to semicontinuous or continuous on-site mixing of ultrapure chemicals.

For another example, the disclosed innovative techniques are not strictly limited to manufacture of integrated circuits, but can also be applied to manufacturing discrete semiconductor components, such as optoelectronic and power devices.

For another example, the disclosed innovative techniques can also be adapted to manufacture of other technologies where integrated circuit manufacturing methods have been adopted, such as in thin-film magnetic heads and active-matrix liquid-crystal displays; but the primary application is in integrated circuit manufacturing, and applications of the disclosed techniques to other areas are secondary.

It should also be noted that piping for ultrapure chemical routing in semiconductor front ends may include in-line or pressure reservoirs. Thus references to "direct" piping in the claims do not preclude use of such reservoirs, but do preclude exposure to uncontrolled atmospheres.

It should also be noted that the invention is not strictly limited to use of one sensor only. For example, the acoustic velocity sensing of the presently preferred embodiment has the disadvantage that, for very dilute HF solutions (in the neighborhood of 1%), the sensor output does not have a one-to-one relation with concentration. Electrical conductivity measurements are therefore preferably used to control the final dilution of HF to the highest dilutions, in the presently preferred embodiment.

What is claimed is:

1. A method for generating precise formulations of ultrapure liquid chemicals on-site at a semiconductor processing facility, comprising the steps of:
   (a.) controllably supplying first, second, and third ultrapure reagent components from first, second, and third sources;
   (b.) mixing said first and second ultrapure reagent components, to generate therefrom a first ultrapure mixture with a first precisely selected formulation, under a control relation which is dependent on the output of a sensor which provides a one-dimensional measurement;
   (c.) mixing said third ultrapure reagent component with said first ultrapure mixture, to generate therefrom a second ultrapure mixture having a second precisely selected formulation, under a control relation which is dependent on the output of a sensor which provides a one-dimensional measurement; and
   (d.) providing said second ultrapure mixture to a piping connection which routes said second ultrapure mixture to points of use in the semiconductor device fabrication facility.

2. The method of claim 1, wherein said first and second reagent components are both acids.

3. The method of claim 1, wherein both said mixing operations are automatically controlled in a closed loop relation.

4. The method of claim 1, wherein both said mixing operations are automatically controlled in a relation which includes feedforward dependence.

5. The method of claim 1, wherein at least one said sensor is an acoustic velocity sensor.

6. A method for generating precise formulations of ultrapure liquid chemicals on-site at a semiconductor processing facility, comprising the steps of:
   (a) controllably supplying first, second, and third ultrapure reagent components from first, second, and third sources;
   (b) mixing said first and second ultrapure reagent components, to generate therefrom a first ultrapure mixture with a first precisely selected formulation, under a control relation which is dependent on the output of a first sensor;
   (c) mixing said third ultrapure reagent component with said first ultrapure mixture, to generate therefrom a second ultrapure mixture having a second precisely selected formulation, under a control relation which is dependent on the output of a second sensor which is different from said first sensor and which also provides a one-dimensional measurement; and (d) providing said second ultrapure mixture to a piping connection which routes said second ultrapure mixture to points of use in the semiconductor device fabrication facility.

7. The method of claim 6, wherein said first and second reagent components are both acids.

8. The method of claim 6, wherein both said mixing operations are automatically controlled in a closed loop relation.

9. The method of claim 6, wherein both said mixing operations are automatically controlled in a relation which includes feedforward dependence.

10. The method of claim 6, wherein at least one said sensor is an acoustic velocity sensor.

11. The method of claim 6, wherein one said sensor is an acoustic velocity sensor, and the other said sensor is a conductivity measurement.

12. A method of mixing a plurality of fluids, the method comprising the steps of:

(a) providing at least a first fluid and a second fluid to be mixed;

(b) causing the fluids to flow through means which allow the fluids to be intermingled and thus form a mixed fluid;

(c) directing an ultrasonic wave through the mixed fluid; and (d) measuring velocity of the wave through the mixed fluid, thereby indicating the density of the mixed fluid and indirect measuring a ratio of a quantity of the first fluid to a quantity of the second fluid in the mixed fluid.

13. The method of claim 12, wherein said first fluid is an acid.

14. The method of claim 12, wherein said second fluid is an acid.

15. The method of claim 12, wherein said first and second fluids are both acids.

16. An on-site system, in a semiconductor device fabrication facility, for providing ultra-high-purity reagents to a semiconductor manufacturing operation, comprising:

first, second, and third sources connected to supply first, second, and third ultrapure reagent components for semiconductor processing;

a mixing apparatus which is connected to said sources to receive said ultrapure reagent components, and to generate mixtures thereof;

a sensor connected to monitor the composition of mixtures of components generated by said mixing apparatus; and control logic connected and configured to regulate the flow of said reagent components into said mixing apparatus, in dependence on the output of said sensor, in a relation such that said mixing apparatus first mixes said first and second components, to a precisely selected formulation, and then mixes said second and third components, to a second precisely selected formulation.

17. The system of claim 16, wherein said first and second reagent components are both acids.

18. The system of claim 16, wherein said control logic includes feedforward dependence.

19. The system of claim 16, wherein at least one said sensor is an acoustic velocity sensor.

20. An on-site system, in a semiconductor device fabrication facility, for providing ultra-high-purity reagents to a semiconductor manufacturing operation, comprising:

first, second, and third sources connected to supply first, second, and third ultrapure reagent components for semiconductor processing;

a mixing apparatus which is connected to said sources to receive said ultrapure reagent components, and to generate mixtures thereof;

a sensor connected to monitor the composition of mixtures of components generated by said mixing apparatus; and control logic connected and configured to regulate the flow of said reagent components into said mixing apparatus, in dependence on the output of said sensor, in a relation such that said mixing apparatus first mixes said first and second components to a precisely selected formulation, in dependence on the output of a first one-dimensional sensor, and then mixes said second and third components to a second precisely selected formulation, in dependence on the output of a second one-dimensional sensor.

21. The system of claim 20, wherein said first and second reagent components are both acids.

22. The system of claim 20, wherein said control logic includes feedforward dependence.

23. The system of claim 20, wherein at least one said sensor is an acoustic velocity sensor.

24. A system for mixing ultrapure fluids, comprising:

(a) first and second chemical dispensers, the first and second chemical dispensers adapted to contain first and second fluids to be mixed, respectively;

(b) a process connection between the first and second chemical dispensers which allows the first and second fluids to flow therethrough and intermingle to form a mixed fluid, the process connection further allowing the mixed fluid to flow to a location needed by the operator; and (c) an ultrasonic wave emitting device, the device provided in a location sufficient to transmit an ultrasonic wave through the mixed fluid, the device including means to measure the velocity of the wave through the mixed fluid, and thus indirectly measure a ratio defined by a quantity of the first fluid to a quantity of the second fluid in the mixed fluid.

25. The system of claim 24, wherein said first fluid and said second fluid are both acids.

* * * * *